(12) United States Patent
Yoon (10) Patent No.: US 8,883,335 B2
(45) Date of Patent: Nov. 11, 2014

(54) BATTERY PACK

(75) Inventor: Ji-Hyoung Yoon, Yongin-si (KR)

(73) Assignees: Samsund SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 61 days.

(21) Appl. No.: 13/491,766

(22) Filed: Jun. 8, 2012

(65) Prior Publication Data

US 2013/0084481 A1   Apr. 4, 2013

(30) Foreign Application Priority Data

Oct. 4, 2011   (KR) .......................... 10-2011-0100632

(51) Int. Cl.
*H01M 2/02* (2006.01)
*H01M 2/10* (2006.01)

(52) U.S. Cl.
CPC .......... *H01M 2/1077* (2013.01); *H01M 2/1094* (2013.01); *Y02E 60/12* (2013.01)
USPC ........................................................... 429/99

(58) Field of Classification Search
None
See application file for complete search history.

(56) References Cited

U.S. PATENT DOCUMENTS

| 2006/0068272 | A1* | 3/2006 | Takami et al. ................... 429/62 |
| 2008/0318119 | A1* | 12/2008 | Watanabe et al. ............... 429/99 |
| 2011/0020677 | A1 | 1/2011 | Shin et al. |
| 2011/0045287 | A1 | 2/2011 | Kawashima et al. |
| 2013/0059180 | A1* | 3/2013 | Yang et al. ....................... 429/72 |

FOREIGN PATENT DOCUMENTS

| KR | 10-2009-0000313 |  | 1/2009 |
| KR | 10-2010-0043757 | A | 4/2010 |

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A battery pack includes a battery module including a plurality of battery cells electrically connected to each other, a housing surrounding the battery module, and a sealing member interposed between the battery module and the housing.

17 Claims, 6 Drawing Sheets

BATTERY PACK

BACKGROUND

1. Field

Example embodiments relate to a battery pack, and more particularly, to a battery pack including a plurality of battery cells.

2. Description of the Related Art

A high-power battery module using non-aqueous electrolyte with high energy density may include a plurality of battery cells connected in series in order to embody a large capacity and to drive the motor of devices that require high power, e.g., electric vehicles, etc. The battery module may be stored in a housing mounted with electronic components having various functions to embody a battery pack. The battery pack may be mounted in the electronics devices to serve as power supply. At this time, the battery pack used as the power supply enables economic consumption to perform, such that importance of power efficiency for the battery pack is being gradually increased.

SUMMARY

Embodiments are directed to a battery pack with improved waterproof and dustproof functions. In addition, the battery pack may exhibit improved energy efficiency and stability.

According to an aspect of example embodiments, there is provided a battery pack, including a battery module including a plurality of battery cells electrically connected to each other, a housing surrounding the battery module, and a sealing member interposed between the battery module and the housing.

The battery module may include at least one first fastening portion, the housing may include at least one second fastening portion corresponding to the first fastening portion, and at least part of the sealing member may be between the first and second fastening portions.

The battery pack may further include a fastening member connecting the first and second fastening portions.

The fastening member may include at least one of bolts, studs, silicone, or adhesive.

The sealing member may include at least one third fastening portion overlapping the first fastening portion and the second fastening portion.

The battery pack may further include a reinforcing member outside the second fastening portion.

The reinforcing member may include at least one fourth fastening portion at a position corresponding to the second fastening portion, the second and fourth fastening portion being connected by a separate fastening member.

The reinforcing member may include a base with at least one fourth fastening portion at a position corresponding to the second fastening portion, and a flange bent in an opposite direction of the housing from the base.

The housing may have a hexahedral shape having an open bottom, the second fastening portion being on a sidewall of the housing and adjacent the open bottom.

A cross-section of the sealing member may be U-shaped, the second fastening portion of the housing being inserted into the U-shaped sealing member.

The battery pack may further include a reinforcing member outside the U-shaped sealing member.

The battery module may include at least one fixing member physically connecting the battery cells to each other.

The fixing member may include a first fastening portion corresponding to the second fastening portion.

The sealing member may include a fluorine-containing rubber.

The sealing member may include at least one of nitrile rubber, highly saturated nitrile rubber, fluoroelastomer, ethylene propylene diene rubber, EPDM rubber, silicon rubber, virgin polytetrafluoroethylene (PTFE), glass-filled PTFE, bronze-filled PTFE, nickel-filled PTFE, polyoxymethylene, aluminum, aluminum alloy, and polyurethane.

The sealing member may include a through hole, the sealing member being a single integral structure surrounding an outer periphery portion of the through hole.

The through hole may have a size corresponding to the battery module, and the battery module being inserted into the through hole to be connected to the sealing member.

The sealing member may have a frame shape, the sealing member contacting and surrounding a bottom portion of the battery module.

The sealing member may include a plurality of linear segments connected to each other to define a hexahedral shape, the segments being integral with each other.

Lateral sidewalls of the battery module may be connected to respective lateral sidewalls of the housing, the sealing member overlapping and contacting regions of sidewalls of the battery module and the housing that are connected to each other.

BRIEF DESCRIPTION OF THE DRAWINGS

Features and advantages will become more apparent to those of ordinary skill in the art by describing in detail exemplary embodiments with reference to the attached drawings, in which.

DETAILED DESCRIPTION

Korean Patent Application No. 10-2011-0100632, filed on Oct. 4, 2011, in the Korean Intellectual Property Office, and entitled: "BATTERY PACK" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer, i.e., an element, is referred to as being "on" another layer or substrate, it can be directly on the other layer or substrate, or intervening layers may also be present. Further, it will also be understood that when a layer is referred to as being "connected" to another layer, it can be the only layer connected to the other layer, or one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1A:
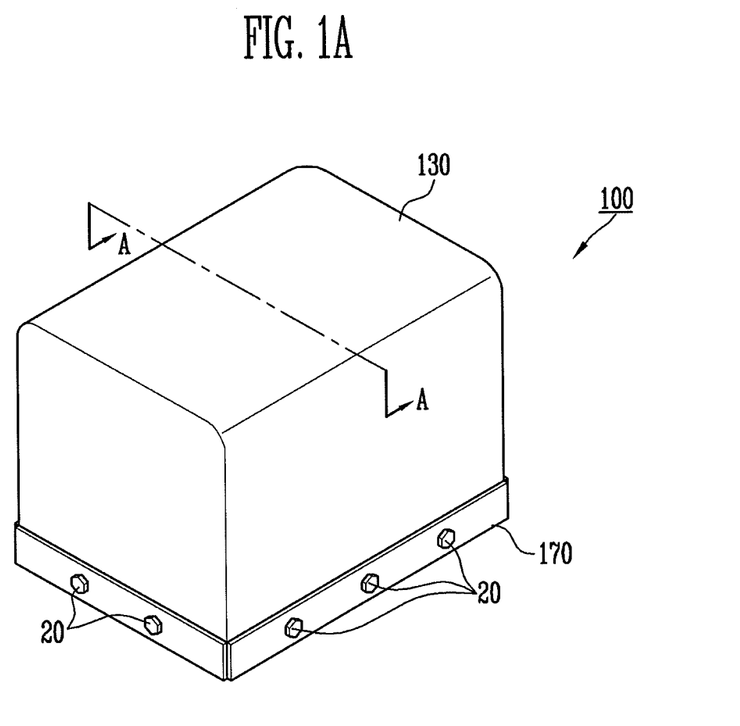
FIG. 1A illustrates a perspective view of a battery pack according to an exemplary embodiment.

Hereinafter, an example embodiment of a battery pack will be described with reference to the attached drawings. FIG. 1A is a perspective view of a battery pack according to an exemplary embodiment, and FIG. 1B is an exploded perspective view of FIG. 1A.

Figure 1B:
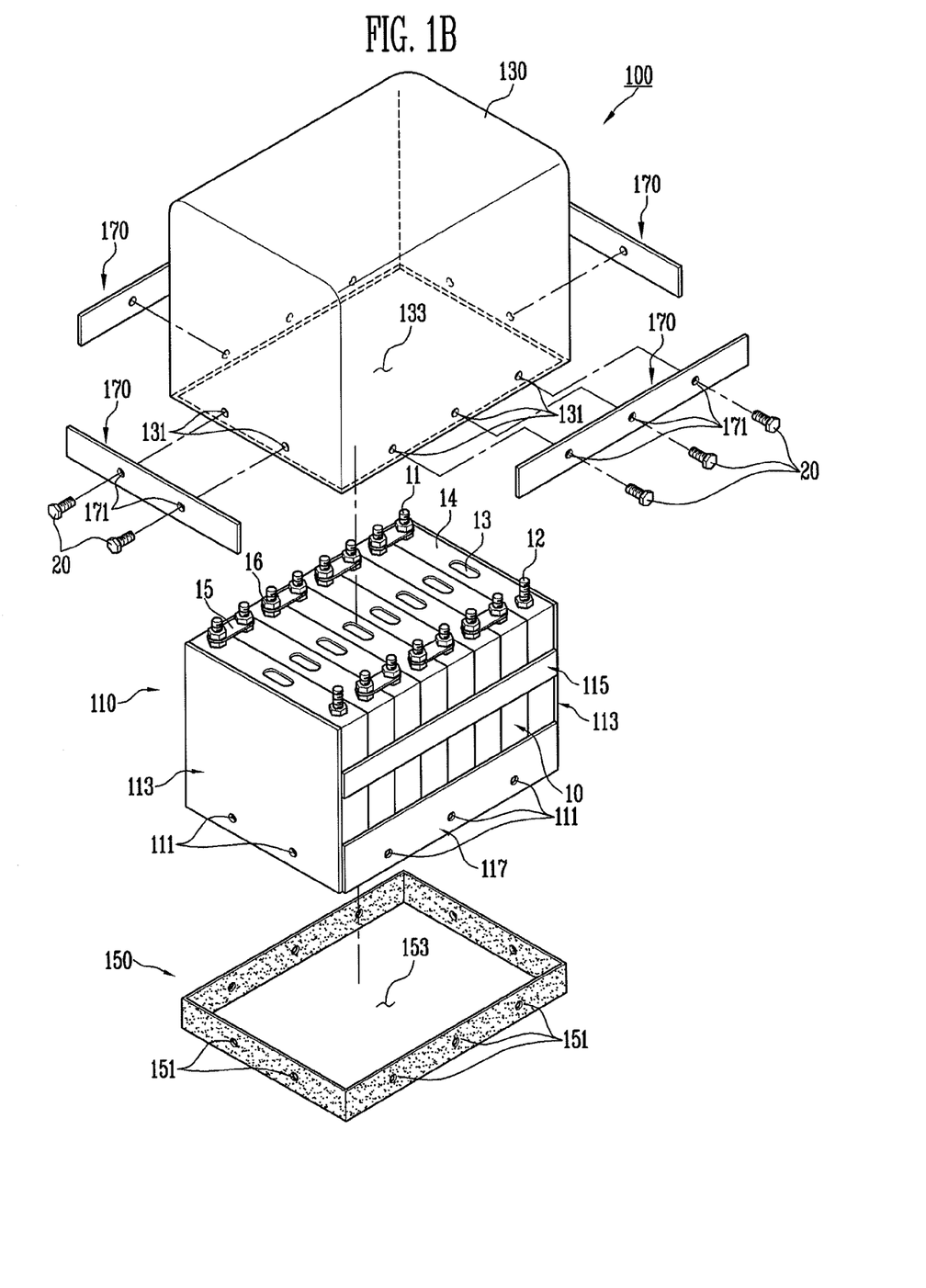
FIG. 1B illustrates an exploded perspective view of FIG. 1A.

Referring to FIGS. 1A and 1B, a battery pack 100 according to an exemplary embodiment may include a battery module 110 with a plurality of battery cells 10 electrically connected to each other, a housing 130 surrounding the battery module 110, and a sealing member 150 interposed between the battery module 110 and the housing 130. Further, the battery module 110 may be provided with at least one of a first fastening portion 111, and the housing 130 may be provided with at least one of a second fastening portion 131 corresponding to, e.g., overlapping, the first fastening portion 111. At least part of the sealing member 150 may be provided between the first and second fastening portions 111,131. At this time, the battery pack 100 may further include a reinforcing member 170 provided outside the second fastening portion 131, e.g., the housing may be between the reinforcing member 170 and battery module 110.

As illustrated in FIG. 1B, the battery module 110 may include a plurality of the battery cells 10 electrically connected to each other. The battery module 110 may include at least one of fixing members 113, 115, 117 to physically connect the battery cells 10 to each other, e.g., the battery module 110 may include at least one of each of the fixing members 113, 115, 117. A battery cell 10 may be manufactured by storing an electrode assembly and electrolyte in a cell case sealed with a cap assembly 14. The cap assembly 14 may include a cathode terminal 11, an anode terminal 12, and a vent 13. The electrode assembly may be connected to the cathode terminal 11 and the anode terminal 12, and the terminals may become moving passages of energy generated by an electrochemical reaction of the electrode assembly and the electrolyte. Further, the vent 13 acts as a passage discharging the gas generated from the inside of the battery cells 10 into the outside.

In detail, the fixing members 113, 115, 117 may include a pair of end plates 113 disposed outside the battery cells 10, and at least one of connecting members 115,117 connecting the end plates 113 to each other. As such, the plurality of battery cells 10 may be positioned between the pair of end plates 113, and may be arranged in one direction.

The pair of end plates 113 and the connecting members 115, 117 may partition, e.g., define, a predetermined space to accommodate the plurality of battery cells 10, and the battery cells 10 may be arranged in one direction in the partitioned space. At this time, wide fronts of the battery cells 10 may be aligned side by side to face each other. The cathode terminal 11 and the anode terminal 12 of two battery cells adjacent to each other may be electrically connected to each other through a bus-bar 15. The bus bar 15 may be provided with holes capable of penetrating the cathode terminal 11 and the anode terminal 12, and the bus bar 15 penetrated and connected by the cathode terminal 11 and the anode terminal 12 through the holes may be fixed, e.g., by a nut 16 etc.

The connecting members 115, 117 may be provided to connect the pair of end plates 113 to each other, while supporting at least one of a side or a bottom surface of the battery cells 10. The connecting member 115, 117 may include a side plate supporting both sides of the battery cells 10, or a bottom plate supporting the bottom surface of the battery cell 10, but are not limited thereto.

At least one side of the pair of end plates 113 and the connecting members 115, 117 may be provided with the first fastening portion 111 corresponding to, e.g., overlapping, the second fastening portion 131. For example, as illustrated in FIG. 1B, the first fastening portion 111 may be formed in the connecting member 117. As such, when the housing 130 covers the battery module 110, the first fastening portion 111 in the connecting member 117 of the battery module 110 is aligned with the second fastening portion 131 in the housing. Further, the first and second fastening portions 111, 131 may be fastened by a separate fastening member 20. For example, the fastening member 20 may include at least one of bolts, studs, silicone, or adhesive. The fixing member 113, 115, 117 including the pair of end plates 113 and the connecting member 115 and 117 may stably fix the plurality of battery cells 10, and may be transformed variously. Further, a connection structure and the number of the battery cell 10 may be transformed variously according to a design of the battery module 100.

The battery module 110 may be protected from penetration of external contaminants, e.g., dust, water, etc., in the housing 130 for electrically stable use, and may be manufactured into the battery pack 100. The housing 130 may be provided with electronic components, e.g., Battery Management System (BMS), a connector, etc., which may be easily used as the power supply of the external device.

The housing 130 may be a hexahedron having an open surface 133 at a bottom thereof, e.g., the housing 130 may be a prism with an open face, and the second fastening portion 131 may be provided on the side of the housing 130 adjacent the open surface 133. For example, the second fastening portion 131 may include a plurality of openings formed through the housing 130 and positioned along a perimeter, e.g., an entire perimeter, of the housing 130. The second fastening portion 131 may correspond to the first fastening portion 111 in the battery module 110, e.g., openings of the second fastening portion 131 may overlap respective openings of the first fastening portion 111, and at least part of the sealing member 150 may be interposed between the first fastening portion 111 and the second fastening portion 131.

Figure 2:
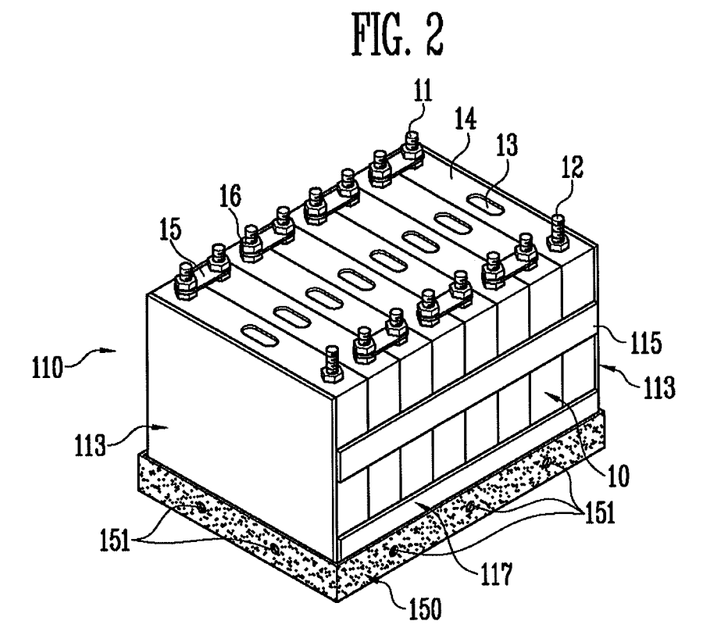
FIG. 2 illustrates a perspective view of a battery module and a sealing member.

FIG. 2 is a perspective view of the battery module 100 and the sealing member 150. Referring to FIGS. 1B and 2, the sealing member 150 may be provided on the first fastening portion 111 of the battery module 110, e.g., to overlap the first fastening portion 111.

In detail, the sealing member 150 may have a frame shape, so the frame-shaped sealing member 150 may, e.g., completely, surround a through hole 153, e.g., the through hole 153 may be formed through the sealing member 150. For example, the sealing member 150 may have all its parts integral with each other, e.g., without seams between the parts. That is, the sealing member 150 may include a plurality of portions integral with each other and configured in a polygonal shape to define a frame, e.g., the sealing member 150 may include four linear portions connected into a single and uniform structure without seams or joints therein to define a frame-shaped structure. In other words, the frame-shaped sealing member 150 may be an integrated type structure on an outer periphery portion of the through hole 153.

The through hole 153 may have a size corresponding to the battery module 110, and the battery module 110 may be inserted into the through hole 153. For example, the inner perimeter of the sealing member 150 may substantially equal, e.g., may be conformal with, an outer perimeter of a bottom of the battery module 110, so the battery module 110 may fit into the through hole 153. In other words, the sealing member 150 may surround and contact, e.g., completely surround and directly contact, the battery module 110, so the battery module 110 may be connected to the sealing member 150. The sealing member 150 may include at least one third fastening portion 151, e.g., a plurality of through holes spaced apart from each other along a perimeter of the sealing member 150, at positions corresponding to the first fastening portion 111 and the second fastening portion 131. For example, the sealing member 150 may be connected to the battery module 110 via the first and third fastening members 111 and 151.

In general, a conventional battery pack may include a plurality of members, e.g., a battery module, a housing, etc., that are physically connected to each other by bolts, etc. However, exterior contaminants, e.g., air, water, etc., may penetrate into the battery pack between members that are physically connected by the bolt, etc. For example, when a housing is connected to a battery module only by bolts, exterior contaminants may penetrate through a seam or a slit between the housing and the battery module. As such, efficient use of the battery pack may be impeded.

According to example embodiments, however, the sealing member 150 may be a uniform structure without seams, and may be interposed and connect between the battery module 110 and the housing 130. That is, the sealing member 150 may be interposed between the first and second fastening portion 111, 131, i.e., between portion by which the battery module 110 and the housing 120 are fastened to each other, to improve sealability of the battery pack 100. Accordingly, penetration of external contaminants, e.g., air or water, may be prevented or substantially minimized into the inside of the battery pack 100. As such, it may be possible to stably use the battery pack 100 and to improve a lifespan of the battery pack 100. For example, as the battery pack 100 may be used as a power supply of electronic equipment, waterproof-dustproof characteristics, i.e., minimized penetration of external contaminants, with respect to the battery cells acting as energy source are important. That is, the minimized penetration of contaminants into the interior of the battery pack 100 may improve safety, e.g., improve stability with respect to external shocks such as vibration.

In the present embodiment, the sealing member 150 is provided by an integrated type. However, since it is enough that at least a portion of the sealing member 150 is interposed between the first and second fastening portion 111, 131, the sealing member 150 is not limited to the integrated type.

The sealing member 150 may include an elastomer to improve sealability between the housing 130 and the battery module 110. For example, the sealing member 150 may include at least one of a fluorine-containing rubber, e.g., fluoroelastomer, virgin polytetrafluoroethylene (PTFE), glass-filled PTFE, bronze-filled PTFE, nickel-filled PTFE, etc., nitrile rubber, highly saturated nitrile rubber, ethylene propylene diene rubber, EPDM rubber, silicon rubber polyoxymethylene, aluminum, aluminum alloy, and polyurethane.

Figure 3:
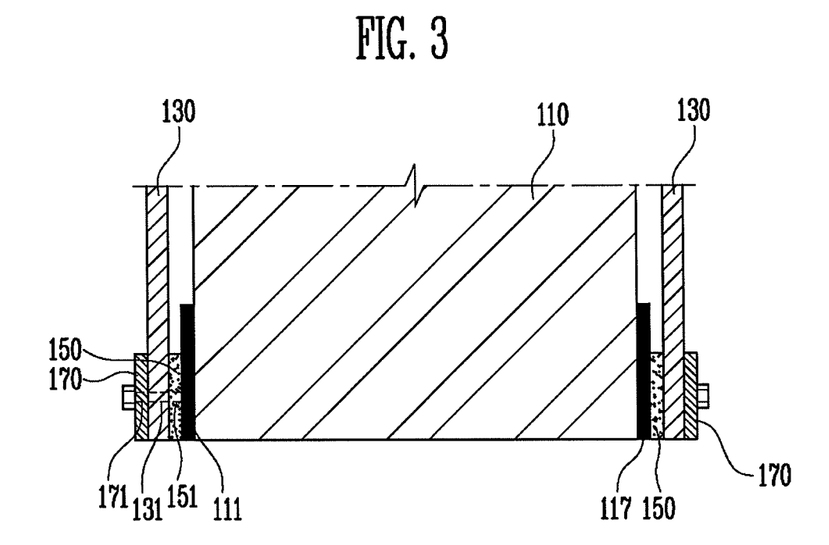
FIG. 3 illustrates a sectional view taken along line A-A of FIG. 1A.

FIG. 3 is a sectional view taken along the line A-A of FIG. 1A. Referring to FIGS. 1A and 3, the battery pack 100 may further include the reinforcing member 170 on the outside of the second fastening portion 131. The reinforcing member 170 may include at least one fourth fastening portion 171 at a position corresponding to the second fastening portion 131. The second and fourth fastening portion 131, 171 may be fastened to each other by separate fastening members 20 (FIG. 1B).

In the battery pack 100 of the present embodiment, the sealing member 150 may be interposed between the first and second fastening portion 111, 131 to fasten the battery module 110 and the housing 130 to each other, and thereby to improve the sealability of the battery pack 100. Further, the sealing member 150 may further include third fastening portions 151 corresponding to the first fastening portion 111 and the second fastening portion 131. At this time, the battery pack 100 may further include the reinforcing member 170 outside the second fastening portion 131, wherein the reinforcing member 170 may include the fourth fastening portion 171 corresponding to the second fastening portion 131.

The first to fourth fastening portion 111, 131, 151, 171 may correspond to each other, and therefore, may be fastened by separate fastening members 20. At this time, the reinforcing member 170 may be provided outside the second fastening portion 131 to reinforce the strength of the second fastening portion 131. Specifically, when fastening using separate fastening members in a conventional battery pack, excess fastening pressure may be applied to the housing, thereby causing cracks in fastening portions and lowering fastening performance between the housing and the battery module, which in turn, may cause poor performance of the battery pack. However, the reinforcing member 170 according to example embodiments may add a predetermined strength outside the second fastening portion 131 of the housing 130, thereby reinforcing strength of the second fastening portion 131. That is, the reinforcing member 170 may alleviate the fastening pressure to be applied when fastening the separate fastening members 20, so the above problem may be prevented. For example, the reinforcing member 170 may be made of aluminum or stainless steel etc., but is not limited thereto.

Hereinafter, in FIGS. 4 and 5A-5B, another example embodiment will be described. Except the content to be described below, a detailed description of elements described previously with reference to FIGS. 1-3 will not be repeated.

Figure 4:
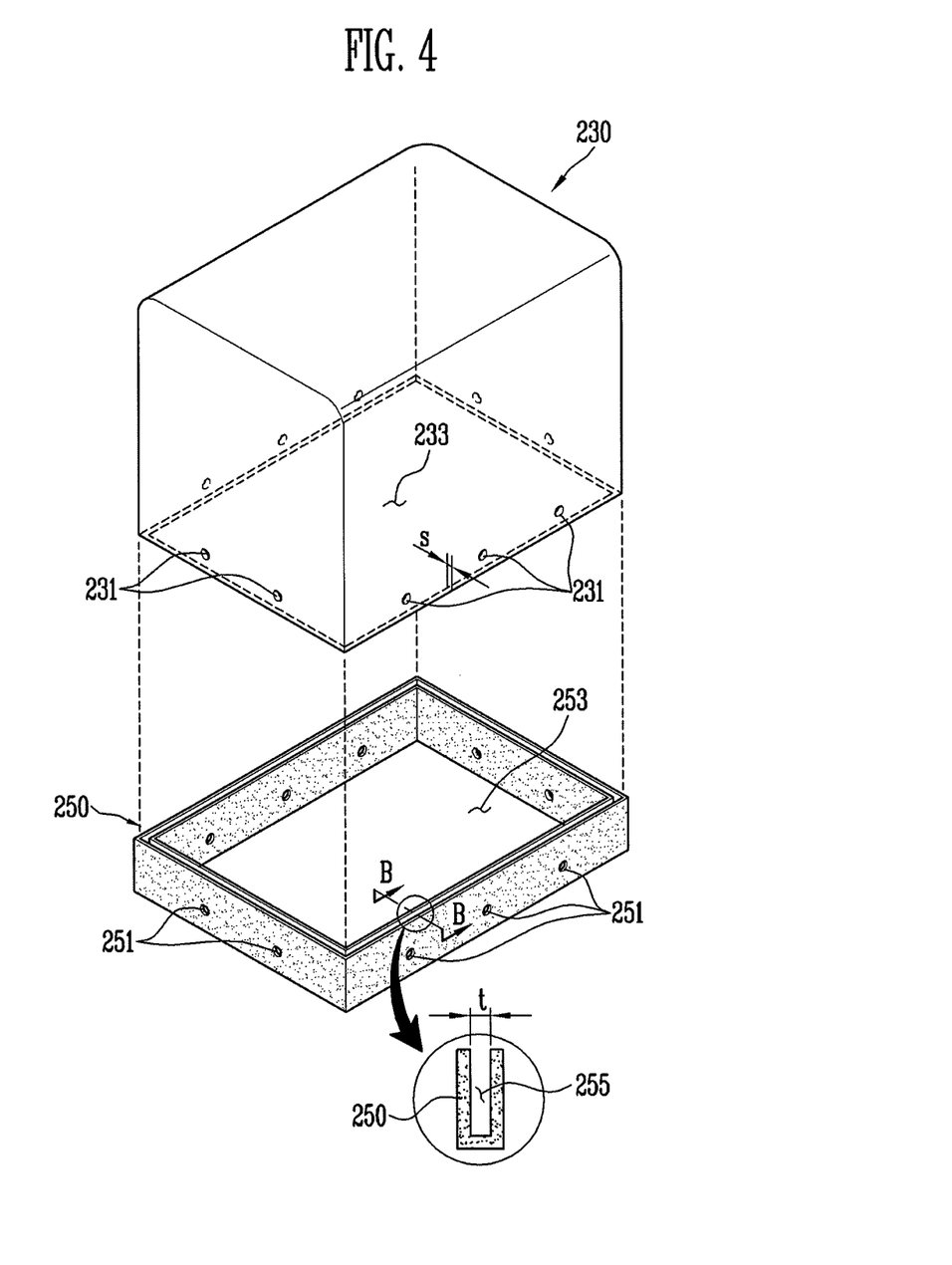
FIG. 4 illustrates a perspective view of a housing and a sealing member according to another embodiment.

FIG. 4 is a perspective view of a housing and a sealing member according to another embodiment. FIG. 5A is a perspective view of a battery pack according to another embodiment, and FIG. 5B is a sectional view along line C-C in FIG. 5A.

Figure 5A:
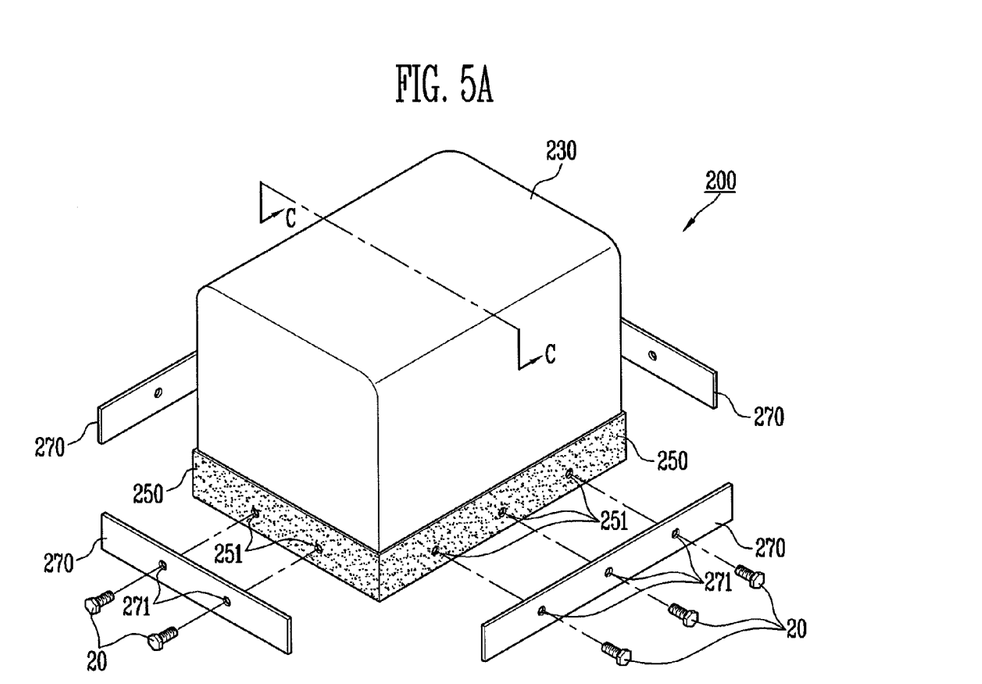
FIG. 5A illustrates a perspective view of a battery pack according to another embodiment.
Figure 5B:
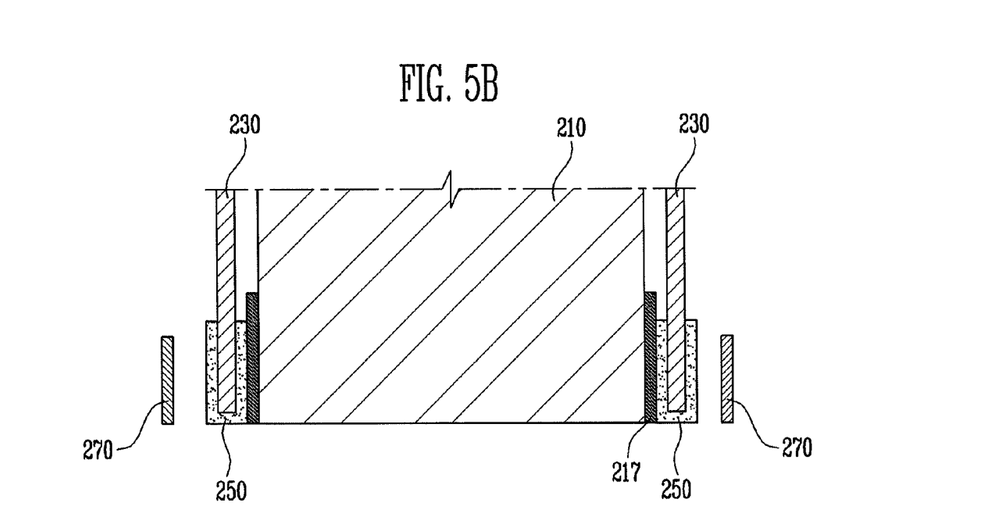
FIG. 5B illustrates a sectional view taken along line C-C of FIG. 5A.

In FIGS. 4-5B, a battery pack 200 may include a battery module 210 and a housing 230 surrounding the battery module 210, and may further include a sealing member 250 interposed between the battery module 210 and the housing 130. Further, a second fastening portion 231 of the housing 230 may be inserted into the sealing member 250.

In detail, the housing 230 of the present embodiment may be a hexahedron having an opening surface 233 at the bottom thereof, and the second fastening portion 231 may be provided on the side of the housing 230 and adjacent the opening surface 233. The cross-section of the sealing member 250 may be U-shaped, so the second fastening portion of the housing 230 may be inserted into the U-shaped sealing member 250. At this time, the sealing member 250 may be provided with a third fastening portion 251 corresponding to the second fastening portion 231.

As illustrated in FIG. 4, the sealing member 250 may include an accommodating portion 255 in the inside thereof. A cross-section length t, i.e., width t, of the accommodation portion 255 may be provided in correspondence to a cross-section length s, i.e., thickness s, of the second fastening portion 231 of the housing 230. That is, the dimensions of "t"

and "s" may substantially equal each other, so the second fastening portion 231 of the housing 230 may be inserted into the accommodating portion 255 of the sealing member 250. Therefore, the second fastening portion 231 of the housing 230, i.e., an end provided to surround opening surface 233 of the housing 230, may be provided to be wrapped as a whole by the sealing member 250. For example, the second fastening portion 231 may include holes etc. Since the second fastening portion 231 has relatively low strength as compared with the periphery thereof, the sealing member 250 of the present embodiment may reinforce the strength of the second fastening portion 231, thereby preventing or substantially minimizing fracture of the housing 230 etc. during manufacturing the battery pack 200.

The sealing member 250 may include a through hole 153 in the inside thereof, and may be provided as an integrated type. The through hole 253 may have a size corresponding to the battery module 210, and the battery module 210 may be inserted into the through hole 253.

Further, the battery pack 200 may further include a reinforcing member 270 provided outside the U-shaped sealing member 250. The reinforcing member 270 may include a fourth fastening portion 271, wherein the fourth fastening portion 271 may be provided in correspondence to the third fastening portion 251 and may be fastened by separate fastening member 20. That is, the sealing member 250 may be interposed between the battery module 210 and the housing 230, i.e., between the first and second fastening portion 211 and 231, or may be interposed between the reinforcing member 270 and the housing 230, i.e., between the second and fourth fastening portion 231 and 271.

Figure 6:
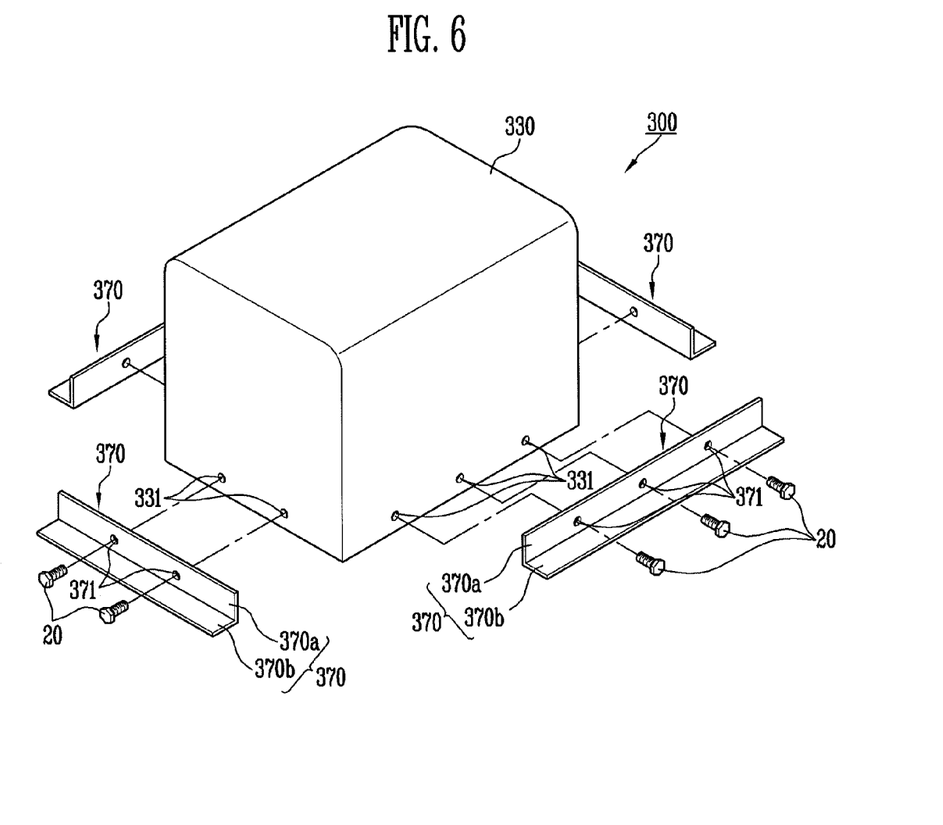
FIG. 6 illustrates a perspective view of a battery pack according to another embodiment.

FIG. 6 is a perspective view of a battery pack according to another embodiment. Referring to FIG. 6, a battery pack 300 may include a battery module, a housing 330, and a sealing member interposed between the battery module and the housing 330. The battery pack 300 may further include a reinforcing member 370 outside a second fastening portion 331 of the housing 330.

The reinforcing member 370 may include a base 370a with at least one fourth fastening portion 371 at a position corresponding to the second fastening portion 331, and a flange 370b bent in an opposite direction of the housing 330 from the base 370a. The fourth fastening portion 371 may be provided at positions corresponding to the second fastening portion 331, and the second and fourth fastening portion 331, 371 may be fastened by separate fastening member 20.

The flange 370b configuring the reinforcing member 370 may be bent to be approximately perpendicular to the base 370a. Therefore, the flange 370b may be provided to be perpendicular to the housing 330 also, and a contact area between the battery pack 300 and an external device may be increased when mounting the battery pack 300 in the external device. That is, since the battery pack 300 may be stably fixed to the external device by the contact area increased by the flange 370b, the stability may be improved for external shocks such as vibration or dropping.

In example embodiments, a battery pack with improved waterproof and dustproof functions may be provided. Further, the battery pack may have improved energy efficiency and stability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments as set forth in the following claims.

What is claimed is:

1. A battery pack, comprising:
   a battery module including a plurality of battery cells electrically connected to each other, and at least one first fastening portion;
   a housing surrounding the battery module, the housing including at least one second fastening portion corresponding to the first fastening portion of the battery module; and
   a sealing member interposed between the battery module and the housing, the battery module being connected to the housing through the sealing member,
   wherein the sealing member includes a through hole, the sealing member being a single integral structure surrounding an outer periphery portion of the through hole and an outer periphery of the battery module, and
   wherein at least part of the sealing member is between the first and second fastening portions, a distance between the first and second fastening portions being equal to a thickness of the sealing member.

2. The battery pack as claimed in claim 1, wherein at least one of the first and second fastening portions includes at least one of bolts, studs, silicone, or adhesive.

3. The battery pack as claimed in claim 1, wherein the sealing member includes at least one third fastening portion overlapping the first fastening portion and the second fastening portion, the first and second fastening portions being connected to each other through the third fastening portion.

4. The battery pack as claimed in claim 1, further comprising a reinforcing member outside the second fastening portion.

5. The battery pack as claimed in claim 4, wherein the reinforcing member includes at least one fourth fastening portion at a position corresponding to the second fastening portion, the second and fourth fastening portion being connected by a separate fastening member.

6. The battery pack as claimed in claim 4, wherein the reinforcing member includes a base with at least one fourth fastening portion at a position corresponding to the second fastening portion, and a flange bent in an opposite direction of the housing from the base.

7. The battery pack as claimed in claim 1, wherein the housing has a hexahedral shape having an open bottom, the second fastening portion being on a sidewall of the housing and adjacent the open bottom, and the housing being connected to the battery module only by the second fastening portion.

8. The battery pack as claimed in claim 1, wherein a cross-section of the sealing member is U-shaped, the second fastening portion of the housing being inserted into the U-shaped sealing member.

9. The battery pack as claimed in claim 8, further comprising a reinforcing member outside the U-shaped sealing member.

10. The battery pack as claimed in claim 1, wherein the battery module includes at least one fixing member physically connecting the battery cells to each other.

11. The battery pack as claimed in claim 10, wherein the fixing member includes a first fastening portion corresponding to the second fastening portion.

12. The battery pack as claimed in claim 1, wherein the sealing member includes a fluorine-containing rubber.

13. A battery pack, comprising:
a battery module including a plurality of battery cells electrically connected to each other;
a housing surrounding the battery module; and
a sealing member interposed between the battery module and the housing, the battery module being connected to the housing through the sealing member,
wherein the sealing member includes a through hole, the sealing member being a single integral structure surrounding an outer periphery portion of the through hole and an outer periphery of the battery module, and
wherein the sealing member includes at least one of nitrile rubber, highly saturated nitrile rubber, fluoroelastomer, ethylene propylene diene rubber, EPDM rubber, silicon rubber, virgin polytetrafluoroethylene (PTFE), glass-filled PTFE, bronze-filled PTFE, nickel-filled PTFE, polyoxymethylene, aluminum, aluminum alloy, and polyurethane.

14. The battery pack as claimed in claim 1, wherein the through hole has a size corresponding to the battery module, and the battery module being inserted into the through hole to be connected to the sealing member.

15. The battery pack as claimed in claim 1, wherein the sealing member has a frame shape, the sealing member contacting and surrounding a bottom portion of the battery module.

16. The battery pack as claimed in claim 1, wherein the sealing member includes a plurality of linear segments connected to each other to define a hexahedral shape, the segments being integral with each other.

17. A battery pack, comprising:
a battery module including a plurality of battery cells electrically connected to each other;
a housing surrounding the battery module; and
a sealing member interposed between the battery module and the housing, the battery module being connected to the housing through the sealing member,
wherein the sealing member includes a through hole, the sealing member being a single integral structure surrounding an outer periphery portion of the through hole and an outer periphery of the battery module, and
wherein only bottom lateral sidewalls of the battery module are connected to respective lateral sidewalls of the housing, the sealing member filling a distance between the bottom lateral sidewalls of the battery module and respective portions of lateral sidewalls of the housing.

* * * * *